US008193904B2

(12) United States Patent
Kawakita

(10) Patent No.: US 8,193,904 B2
(45) Date of Patent: Jun. 5, 2012

(54) ENTRY AND EXIT CONTROL APPARATUS AND ENTRY AND EXIT CONTROL METHOD

(75) Inventor: Hijiri Kawakita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/588,726

(22) Filed: Oct. 26, 2009

(65) Prior Publication Data

US 2010/0045424 A1 Feb. 25, 2010

Related U.S. Application Data

(63) Continuation of application No. PCT/JP2007/059097, filed on Apr. 26, 2007.

(51) Int. Cl.

*G05B 19/00* (2006.01)
*B60R 25/10* (2006.01)
*G06F 21/00* (2006.01)
*G06F 7/04* (2006.01)

(52) U.S. Cl. ....... 340/5.2; 340/5.8; 340/426.1; 713/182; 713/184; 726/4

(58) Field of Classification Search ........................ None
See application file for complete search history.

(56) References Cited

U.S. PATENT DOCUMENTS

| | | | | |
|---|---|---|---|---|
| 4,760,393 | A * | 7/1988 | Mauch | 340/5.54 |
| 4,839,640 | A * | 6/1989 | Ozer et al. | 340/5.33 |
| 6,351,817 | B1 * | 2/2002 | Flyntz | 726/4 |
| 7,353,396 | B2 * | 4/2008 | Micali et al. | 713/176 |
| 7,636,853 | B2 * | 12/2009 | Cluts et al. | 713/186 |
| 7,821,220 | B2 * | 10/2010 | El-Ibiary | 318/600 |
| 2004/0025052 | A1 * | 2/2004 | Dickenson | 713/201 |
| 2007/0078782 | A1 * | 4/2007 | Ono et al. | 705/67 |
| 2008/0272881 | A1 * | 11/2008 | Goel | 340/5.3 |

FOREIGN PATENT DOCUMENTS

| | | |
|---|---|---|
| JP | 62-49490 | 3/1987 |
| JP | 63-300177 | 12/1988 |
| JP | 10-280752 | 10/1998 |
| JP | 2006-338451 | 12/2006 |

OTHER PUBLICATIONS

International Search Report for PCT/JP2007/059097, mailed Jul. 24, 2007.

* cited by examiner

*Primary Examiner* — Jennifer Mehmood
*Assistant Examiner* — Fekadeselassie Girma
(74) *Attorney, Agent, or Firm* — Fujitsu Patent Center

(57) ABSTRACT

When a user enters or leaves an area to which a security level is assigned, it is determined whether the user is allowed to enter or leave the area by performing authentication. When the user moves between areas to which different security levels are preliminarily assigned, appropriate authentication is performed on the user depending on the difference between the security levels of the areas.

11 Claims, 9 Drawing Sheets

FIG.3

| GATE NAME | BIOMETRIC AUTHENTICATION INFORMATION | AREA INFORMATION | OPEN/CLOSE CONTROL INFORMATION |
|---|---|---|---|
| GATE A | VEIN INFORMATION | AREA A, AREA B | 12:00 OPENED<br>12:01 CLOSED |
| GATE B | VEIN INFORMATION | AREA B, AREA C | 12:20 OPENED<br>12:21 CLOSED |
| ⋮ | ⋮ | ⋮ | ⋮ |

FIG.4

| PERSONAL ID | NAME | BIOMETRIC AUTHENTICATION DATA | RADIO TAG ID | EXPIRATION DATE | ENTRY/EXIT POSSIBLE AREA |
|---|---|---|---|---|---|
| 001 | TARO TOKKYO | VEIN INFORMATION A | 01 | 2009/3/31 | ALL |
| 002 | HANAKO TOKKYO | VEIN INFORMATION B | 02 | 2008/12/31 | SECURITY LEVEL 2 |
| ⋮ | ⋮ | ⋮ | ⋮ | ⋮ | ⋮ |

FIG.5

| RADIO TAG ID | RADIO-TAG AUTHENTICATION DEVICE INFORMATION | AREA INFORMATION |
|---|---|---|
| 01 | RADIO-TAG AUTHENTICATION DEVICE $R_2$ | AREA B |
| 02 | RADIO-TAG AUTHENTICATION DEVICE $R_1$ | AREA A |
| ⋮ | ⋮ | ⋮ |

FIG.6

| USER INFORMATION | PRESENCE AREA INFORMATION | CONTINUITY | USER SECURITY LEVEL |
|---|---|---|---|
| TARO TOKKYO (001) | AREA A | CONTINUING | SECURITY LEVEL 1 |
| TARO TOKKYO (001) | AREA B | NO | SECURITY LEVEL 1 |
| ⋮ | ⋮ | ⋮ | ⋮ |

FIG.7

| USER INFOR-MATION | TIME AND DATE | GATE INFOR-MATION | AUTHENTICATION DEVICE INFORMATION | AREA INFOR-MATION | AUTHEN-TICATION RESULT |
|---|---|---|---|---|---|
| TARO TOKKYO (001) | 2007/4/1 | GATE A | BIOMETRIC AUTHENTICATION DEVICE $B_1$ | AREA A | ALLOWED |
| HANAKO TOKKYO (002) | 2006/12/1 | GATE B | BIOMETRIC AUTHENTICATION DEVICE $B_3$ | AREA B | REJECTED |
| ⋮ | ⋮ | ⋮ | ⋮ | ⋮ | ⋮ |

FIG.8

| PRESENCE AREA INFORMATION | CONTINUITY | USER SECURITY LEVEL | AREA SECURITY LEVEL |
|---|---|---|---|
| AREA A | CONTINUING | SECURITY LEVEL 1 | SECURITY LEVEL 1 |
| AREA B | NO | SECURITY LEVEL 1 | SECURITY LEVEL 2 |
| ⋮ | ⋮ | ⋮ | ⋮ |

| TIME AND DATE | AREA | PERSON PRESENT | AREA SECURITY LEVEL |
|---|---|---|---|
| 2007/4/1 | AREA A | TARO TOKKYO (001) | SECURITY LEVEL 1 |

ENTRY AND EXIT CONTROL APPARATUS AND ENTRY AND EXIT CONTROL METHOD

CROSS-REFERENCE TO RELATED APPLICATION(S)

This application is a continuation of International Application No. PCT/JP2007/059097, filed on Apr. 26, 2007, the entire contents of which are incorporated herein by reference.

FIELD

The embodiments discussed herein are directed to an entry and exit control method and an entry and exit control apparatus that, when a user enters or leaves an area to which a security level is assigned, determines, by performing a plurality of types of authentication, whether the user is allowed to enter or leave the area.

BACKGROUND

An entry and exit control system has been conventionally used for the purpose of security to protect information assets or material possessions of companies and individuals against theft or for the purpose of accident prevention to control entry to dangerous areas. For these purposes, security guard rooms, entry and exit authentication devices, and electric-lock gates are arranged in numerous locations where people and things pass.

In an entry and exit control system that implements such high security control, each time a user moves from one office or room to the other, the user goes through a series of authentication procedures or security checks before entering or leaving the office or room. If the entry and exit control system excessively implements these measures, sometimes the convenience for employees who work at the office is decreased, their productivity is lowered, and discomfort is caused to visitors.

In the case of an entry and exit control system that places emphasis on convenience, because a security guard visually checks users, the checking causes uncertainty, for example, the security guard allows tailgating when the user enters or leaves a room, and the entry and exit control system often deals with the users depending on the user's common sense and morals; therefore, the entry and exit control system does not implement high security control. Various entry and exit control systems are disclosed which maintain high security control while placing emphasis on convenience and comfort.

For example, Japanese Laid-open Patent Publication No. 10-280752 discloses various entry and exit control systems in which data needs to be input in accordance with the security level of an area, whereby high security control is maintained while the emphasis is placed on convenience. Specifically, authentication using a predetermined password is performed in an area (room) with a high security level in addition to an authentication procedure, such as biometric authentication or authentication using an ID card, and only the above authentication procedure is performed in an area with a low security level. Thus, a password needs to be input in accordance with the security level of the area, whereby the high security control is maintained while the emphasis is placed on convenience and comfort.

The above conventional technology has a problem in that although the high security control is maintained, the procedure for entering or leaving an area is complicated; therefore, the emphasis is not placed on convenience and comfort. Specifically, when the user moves through an area with a high security level, i.e., moves from an area with a low security level to an area with a high security level or moves from an area with a high security level to an area with a low security level, it is necessary to perform a complicated authentication procedure each time as performed with conventional technology; therefore, the emphasis is not placed on convenience or comfort.

SUMMARY

According to an aspect of an embodiment of the invention, an entry and exit control apparatus for determining, when a user enters or leaves an area to which a security level is assigned, whether the user is allowed to enter or leave the area by performing authentication, includes an authentication unit that performs, when the user moves between areas to which different security levels are preliminarily assigned, appropriate authentication on the user depending on a difference between the different security levels of the areas.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram that illustrates an example of information stored in a gate information DB;

FIG. 4 is a diagram that illustrates an example of information stored in a user DB;

FIG. 5 is a diagram that illustrates an example of information stored in a radio tag DB;

FIG. 6 is a diagram that illustrates an example of information stored in a user presence DB;

FIG. 7 is a diagram that illustrates an example of information stored in a user trail DB;

FIG. 8 is a diagram that illustrates an example of information stored in an area presence DB;

DESCRIPTION OF EMBODIMENT(S)

Preferred embodiments of the present invention will be explained with reference to accompanying drawings. Explanations will be sequentially given of the main terms used in the embodiment, the overview and characteristics of the entry and exit control apparatus according to the embodiment, and the configuration and processing flow of the entry and exit control apparatus. Finally, an explanation will be given of various modified examples of the embodiment.

[a] First Embodiment

Definition of Terms

First, an explanation will be given of the terms used in the embodiment. An "entry and exit control apparatus" used in the embodiment is an apparatus that determines, when a user enters or leaves an area (room) to which a security level is assigned, whether the user is allowed to enter or leave the area by performing authentication.

Generally, advanced (complicated) authentication is performed when the user enters or leaves an area with a high security level. Therefore, if the high security level is set for various areas, it is possible to achieve high security control as a whole. However, if the high security level is set to a large number of areas, it is necessary to frequently implement an advanced authentication method, which results in a decrease in the convenience for the user. Therefore, there is a need for implementation of a high security in such an area entry and exit control apparatus without decreasing the convenience for the user.

Although it is explained in the embodiment that a plurality of types of authentication (for example, two types of authentication, i.e., "authentication using a radio tag" and "biometric authentication using biological information") is performed as appropriate authentication depending on the difference between the security levels of areas, the present invention is not limited to this configuration. For example, three types of authentication that additionally includes "authentication using a password" can be performed. There are no limitations on the types and number of authentication. Furthermore, information about physical features (biological features), behavioral features (habits), or the like, that makes it possible to identify a user can be used for authentication. For convenience, areas are defined in the embodiment as areas A to C, authentication devices as biometric authentication devices $B_1$ to $B_5$ and radio-tag authentication devices $R_1$ to $R_5$, gates through which the user enters or leaves the areas as gates A to C, and apparatuses that control electric locks for the gates as electric-lock control devices $C_A$ to $C_C$. However, the numbers and the names are not limited to those described above.

Overview and Characteristics of the Entry and Exit Control Apparatus

Figure 1:
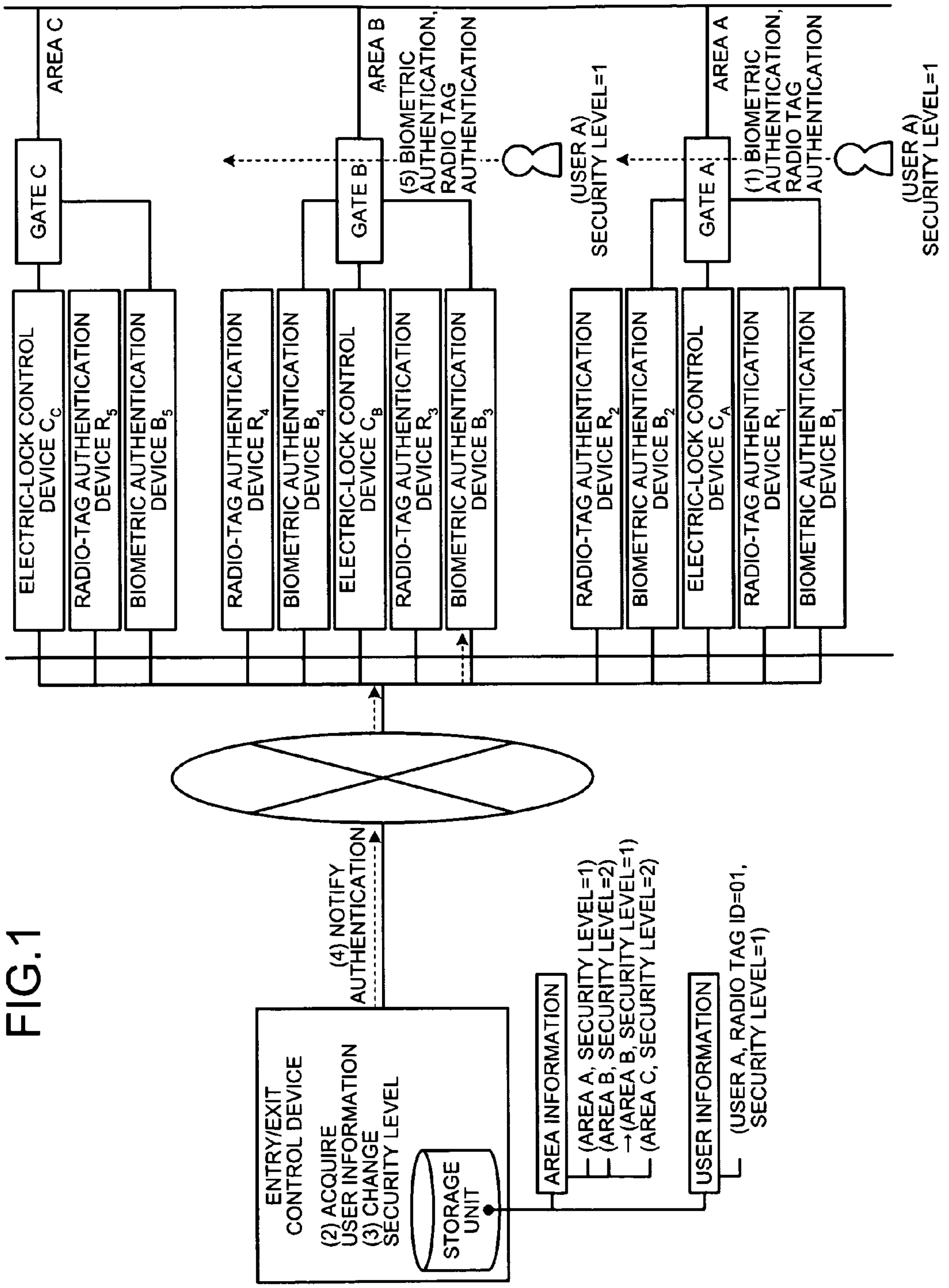
FIG. 1 is a system configuration diagram that illustrates the overall configuration of a system that includes an entry and exit control apparatus according to a first embodiment.

Next, an explanation will be given of the overview and characteristics of the entry and exit control apparatus according to a first embodiment with reference to FIG. 1. FIG. 1 is a system configuration diagram that illustrates the overall configuration of a system that includes the entry and exit control apparatus according to the first embodiment.

As depicted in FIG. 1, the system is configured by connecting the radio-tag authentication devices and the biometric authentication devices that authenticate the validity of the user when the user enters or leaves an area and are located between the areas to which security levels are assigned; the electric-lock control devices $C_A$ to $C_C$ that each include a display operation unit, such as a touch panel, to unlock the gates connected thereto; the gates A to C that are opened and closed by the electric-lock control devices $C_A$ to $C_C$; and the entry and exit control apparatus via a network such as the Internet.

The electric-lock control devices $C_A$ to $C_C$ are arranged for the gates A to C located between the respective areas to unlock the gates. Upon receiving an unlock instruction from the biometric authentication devices $B_1$ to $B_5$, the electric-lock control devices $C_A$ to $C_C$ unlock the gates and allow the user to pass through the gates.

The radio-tag authentication devices $R_1$ to $R_5$ store therein a radio tag ID that is stored in a radio tag owned by the user and automatically acquire the radio tag ID from the radio tag located at a distance for which the radio-tag authentication devices $R_1$ to $R_5$ can recognize the radio tag. If the radio-tag authentication devices $R_1$ to $R_5$ have stored therein the acquired radio tag ID, the radio-tag authentication devices $R_1$ to $R_5$ allow the authentication and notify the entry and exit control apparatus that the authentication is allowed. In the same manner, the biometric authentication devices $B_1$ to $B_5$ acquire vein information from a user's hand, and, if the biometric authentication devices $B_1$ to $B_5$ have stored therein the acquired vein information or if the biometric authentication devices $B_1$ to $B_5$ receive "unlock notification" from the area entry and exit control apparatus, the biometric authentication devices $B_1$ to $B_5$ transmit a corresponding instruction to the connected electric-lock control device.

Furthermore, upon receiving "authentication notification" from the entry and exit control apparatus, the biometric authentication devices $B_1$ to $B_5$ perform the biometric authentication. If the biometric authentication devices $B_1$ to $B_5$ determine that the authentication is allowed, the biometric authentication devices $B_1$ to $B_5$ transmit the "unlock notification" to the connected electric-lock control device. If the biometric authentication devices $B_1$ to $B_5$ determine that the authentication is rejected, the biometric authentication devices $B_1$ to $B_5$ transmit "unlock rejection" to the connected electric-lock control device. Upon receiving the unlock instruction, the electric-lock control device unlocks the gate. The radio-tag authentication devices $R_1$ to $R_5$ store therein "radio tag ID=01", and the biometric authentication devices $B_1$ to $B_5$ store therein "biological information=vein information A".

The entry and exit control apparatus stores therein the "security level" assigned to each of the areas as area information in association with the "area" in which the connected radio-tag authentication device and the connected biometric authentication device are located. To take a specific example, the entry and exit control apparatus stores therein the area information such as ("area name" that indicates an area, "security level" that indicates an assigned security level). The area information is, for example, (area A, security level=1), (area B, security level=2), and (area C, security level=2).

Moreover, the entry and exit control apparatus stores therein, as user information, a "radio tag ID" for uniquely identifying the radio tag owned by the user and "security level" stored in the radio tag in association with a "user name" who owns the radio tag in which the security level is stored. To take a specific example, the entry and exit control apparatus stores, in the user information, ("user name" that indicates the user who owns the radio tag, "radio tag ID" that uniquely identifies the radio tag, "security level" that indicates the security level stored in the radio tag) such as (user A, ID=01, security level=1).

With such a configuration, as described above, the overview of the entry and exit control apparatus is that when the user enters or leaves the area to which the security level is assigned, the entry and exit control apparatus performs a plurality of types of authentication to determine whether the user is allowed to enter or leave the area, and the main characteristic of the entry and exit control apparatus is particularly that convenience and comfort can be improved while high security control can be maintained.

A detailed explanation will be given of the main characteristic. The entry and exit control apparatus acquires information about the user who enters the area B from the area A (see (1) and (2) in FIG. 1). A detailed explanation is given with the above example. When the user A enters the area B from the area A, the radio tag authentication and the biometric authentication are performed because the user enters the area B with the security level 2 from the area A with the security level 1. Specifically, the radio-tag authentication device $R_1$ acquires the radio tag ID "01" from the radio tag owned by the user A, and, if the radio-tag authentication device $R_1$ has stored therein the acquired radio tag ID, the radio-tag authentication device $R_1$ allows the authentication and notifies the entry and exit control apparatus that the authentication is allowed. In the same manner, the biometric authentication device $B_1$ acquires the vein information from the hand of the user A, and, if the biometric authentication device $B_1$ has stored therein the acquired vein information or if the biometric authentication device $B_1$ receives the "unlock notification" from the entry and exit control apparatus, the biometric authentication device $B_1$ notifies the electric-lock control device $C_A$ of an instruction to unlock the gate. Upon receiving the unlock instruction from the biometric authentication device $B_1$, the electric-lock control device $C_A$ unlocks the gate, whereby the user A enters the area B.

When the user A enters the area B, the radio-tag authentication device $R_2$ acquires the radio tag ID "01" from the radio tag owned by the user A and then transmits the acquired radio tag ID "01" to the entry and exit control apparatus. The area entry and exit control apparatus then acquires the user name "user A" and the security level "1" corresponding to the radio tag ID "01" acquired from the radio-tag authentication device $R_1$ from the user information and acquires the security level "2" of the area B that the user A has entered from the area information.

The entry and exit control apparatus then changes the security level assigned to the area in accordance with the security level of the user currently present in the area (see (3) in FIG. 1). A detailed explanation is given with the above example. The entry and exit control apparatus changes the security level of the area B to "1" because the security level of the user A currently present in the area B is "1" and the security level of the area B is "2".

When the user moves between the areas whose security level have been changed, the entry and exit control apparatus performs a plurality of types of authentication on the user depending on the difference between the security levels of the areas (see (4) and (5) in FIG. 1). A detailed explanation is given with the above example. When the user A moves from the area B whose security level has been changed from "2" to "1" to the area C with the security level "2", the entry and exit control apparatus transmits the "authentication notification" to the biometric authentication device $B_3$ so that the gate is unlocked only if both the authentication using the radio tag and the authentication using the biological information are allowed. If the user A moves from the area B whose security level has been changed from "2" to "1" to the area A with the security level "1", the area entry and exit control apparatus notifies the biometric authentication device $B_2$ of the "unlock notification" so that the gate is unlocked if the authentication using the radio tag is allowed, because the radio-tag authentication device $R_2$ has performed the authentication on the user A when the user A entered the area B through the gate A.

Specifically, because the security levels of both the area B and the area C are originally "2", only the radio tag authentication is performed to allow the user to pass through gate C. Similarly, because the security level of the area B is "2" and the security level of the area A is "1", only the radio tag authentication is performed to allow the user to pass through the gate B. However, because the user A with the security level "1" is present in the area B, the entry and exit control apparatus lowers the security level of the area B to "1". As a result, because the security level of the area B is "1" and the security level of the area C is "2", the user is allowed to pass through the gate C only if both the radio tag authentication and the biometric authentication are allowed. Because the security levels of both the area B and the area A are "1", the use is allowed to pass through the gate A if only the radio tag authentication is allowed.

In this manner, the entry and exit control apparatus according to the first embodiment can dynamically change the security level of the area in accordance with the security level of the user currently present in the area. As a result, convenience and comfort can be improved while high security control can be maintained as described above in the main characteristic.

Configuration of the Entry and Exit Control Apparatus

Figure 2:
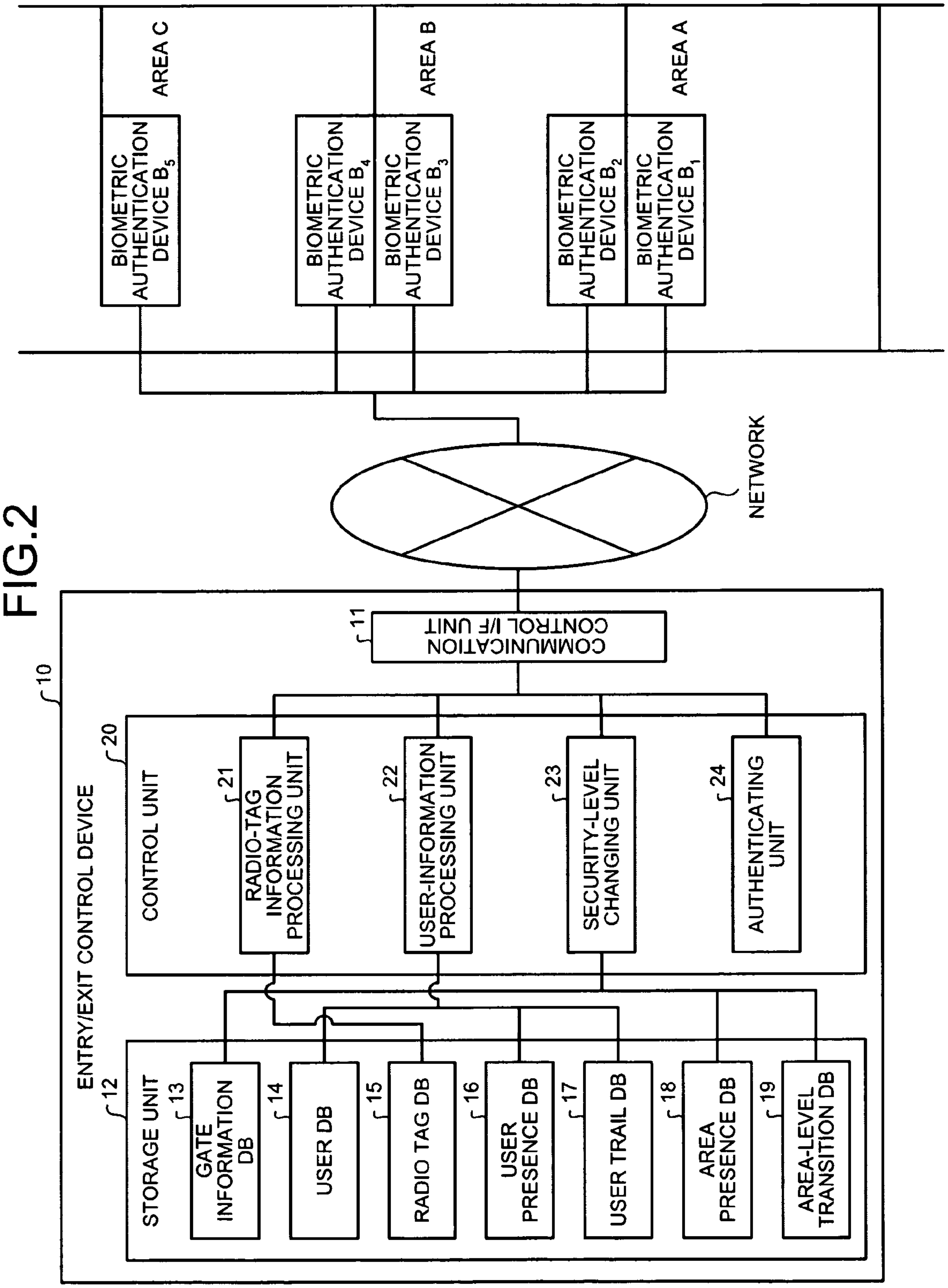
FIG. 2 is a block diagram that illustrates the configuration of an entry and exit control apparatus according to the first embodiment.

Next, an explanation will be given of the configuration of the entry and exit control apparatus depicted in FIG. 1 with reference to FIG. 2. FIG. 2 is a block diagram that illustrates the configuration of the entry and exit control apparatus according to the first embodiment. As depicted in FIG. 2, an entry and exit control apparatus 10 includes a communication control I/F unit 11, a storage unit 12, and a control unit 20.

The communication control I/F unit 11 controls communication for various types of information transmitted between the electric-lock control devices $C_A$ to $C_C$, the radio-tag authentication devices $R_1$ to $R_5$, and the biometric authentication devices $B_1$ to $B_5$. To take a specific example, the communication control I/F unit 11 transmits the unlock notification or the authentication notification output from the control unit 20 described later to the biometric authentication devices $B_1$ to $B_5$. The communication control I/F unit 11 also receives the radio tag ID or an authentication result transmitted from the radio-tag authentication devices $R_1$ to $R_5$ and outputs the radio tag ID or the authentication result to the control unit 20.

The storage unit 12 stores therein data and programs necessary for various processes performed by the control unit 20. The storage unit 12 includes a gate information DB 13, a user DB 14, a radio tag DB 15, a user presence DB 16, a user trail DB 17, an area presence DB 18, and an area-level transition DB 19 that are the components closely associated with the present invention in particular.

The gate information DB 13 stores therein information about the gates located between the areas. To take a specific example, as depicted in FIG. 3, the gate information DB 13 stores therein "biometric authentication information", "area information", and "open/close control information" in association with a "gate name" that indicates a target gate. For example, the gate information DB 13 stores therein (gate A, vein information, area A, area B, 12:00 opened, 12:01 closed).

The "biometric authentication information" indicates a type of biological information to be used for the gate stored in the "gate name". For example, the biometric authentication information is vein information, a fingerprint, iris, or a voiceprint. The area information indicates names of adjacent areas that are separated by the gate stored in the "gate name". The "open/close control information" is log information in which the open/close status of the gate stored in the "gate name" is stored. FIG. 3 is a diagram that illustrates an example of information stored in the gate information DB.

The user DB 14 stores therein information about the user who owns the radio tag. To take a specific example, as depicted in FIG. 4, the user DB 14 stores therein "name", "biometric authentication data", "radio tag ID", "expiration date", and "entry/exit possible area" in association with the "personal ID" uniquely assigned to the user. For example, the user DB 14 stores therein (001, Taro Tokkyo, vein information A, 01, 2009 Mar. 31, ALL), (002, Hanako Tokkyo, vein information B, 02, 2008 Dec. 31, security level 2).

The "name" indicates the name of the user. The "biometric authentication data" indicates a type of biological information registered to be used. The "radio tag ID" indicates an identifier for uniquely identifying the radio tag owned by the user. The "expiration date" indicates the expiration date of the radio tag. The "entry/exit possible area" indicates the security level of an area that the user can enter or leave. If "ALL" is stored in the "entry/exit possible area", the user can enter or leave the areas with any security level. If "security level 2" is stored in the "entry/exit possible area", the user can enter or leave an area with the security level equal to or less than "2". FIG. 4 is a diagram that illustrates an example of information stored in the user DB.

The radio tag DB 15 stores therein information about the radio tag owned by the user and detected by the radio-tag authentication device. To take a specific example, as depicted in FIG. 5, the radio tag DB 15 stores therein "radio-tag authentication device information" indicative of the radio-tag authentication device that has detected the radio tag ID and "area information" indicative of the area in which the detected radio tag is present in association with "radio tag ID" detected by the radio-tag authentication device. For example, the radio tag DB 15 stores therein (01, radio-tag authentication device $R_2$, area B). In this example, it is indicated that the radio tag ID "01" is detected by the radio-tag authentication device $R_2$ in the area B. FIG. 5 is a diagram that illustrates an example of information stored in the radio tag DB.

The user presence DB 16 stores therein an area in which the user is present. To take a specific example, as depicted in FIG. 6, the user presence DB 16 stores therein "presence area information", "continuity", and "user security level" in association with "user information" that indicates the name of the user. For example, the user presence DB 16 stores therein "Taro Tokkyo (001), area A, continuing, security level 1", "Taro Tokkyo (001), area B, no, security level 1", and the like. The "name" and the "personal ID" of the user are stored in the "user information".

The "presence area information" indicates the area in which the user stored in the "user information" is present. The "continuity" indicates whether the authentication of the user stored in the "user information" is continuing. The "user security level" indicates the security level stored in the radio tag owned by the user stored in the "user information". FIG. 6 is a diagram that illustrates an example of information stored in the user presence DB.

The user trail DB 17 stores therein trails of the user who enters or leaves the areas. To take a specific example, as depicted in FIG. 7, the user trail DB 17 stores therein "time and date", "gate information", "authentication device information", "area information", and "authentication result" in association with "user information" indicative of the name of the user. For example, the user trail DB 17 stores therein (Taro Tokkyo (001), 2007 Apr. 1, gate A, biometric authentication device $B_1$, area A, allowed) and (Hanako Tokkyo (002), 2006 Dec. 1, gate B, biometric authentication device $B_3$, area B, rejected). The "full name" and the "personal ID" of the user are stored in the "user information".

The "time and date" indicates the time and date on which the authentication is performed. The "gate information" indicates a target gate through which the user desires to pass and for which the authentication is performed. The "authentication device information" indicates the authentication device that performs the authentication. The "area information" indicates the area in which the user is present when the authentication is performed. The "authentication result" indicates whether the authentication is allowed or rejected. FIG. 7 is a diagram that illustrates an example of information stored in the user trail DB.

The area presence DB 18 stores therein a presence status of the user in the area. To take a specific example, as depicted in FIG. 8, the area presence DB 18 stores therein "continuity", "user security level", and "area security level" in association with "presence area information" indicative of an area. For example, the area presence DB 18 stores therein (area A, continuing, security level 1, security level 1).

The "continuity" indicates whether the authentication of the user is continuing in the area stored in the "presence area information". The "user security level" indicates the lowest security level among users present in the "presence area information". The "area security level" indicates the security level assigned to the area stored in the "presence area information". FIG. 8 is a diagram that illustrates an example of information stored in the area presence DB.

Figures 9, 10:
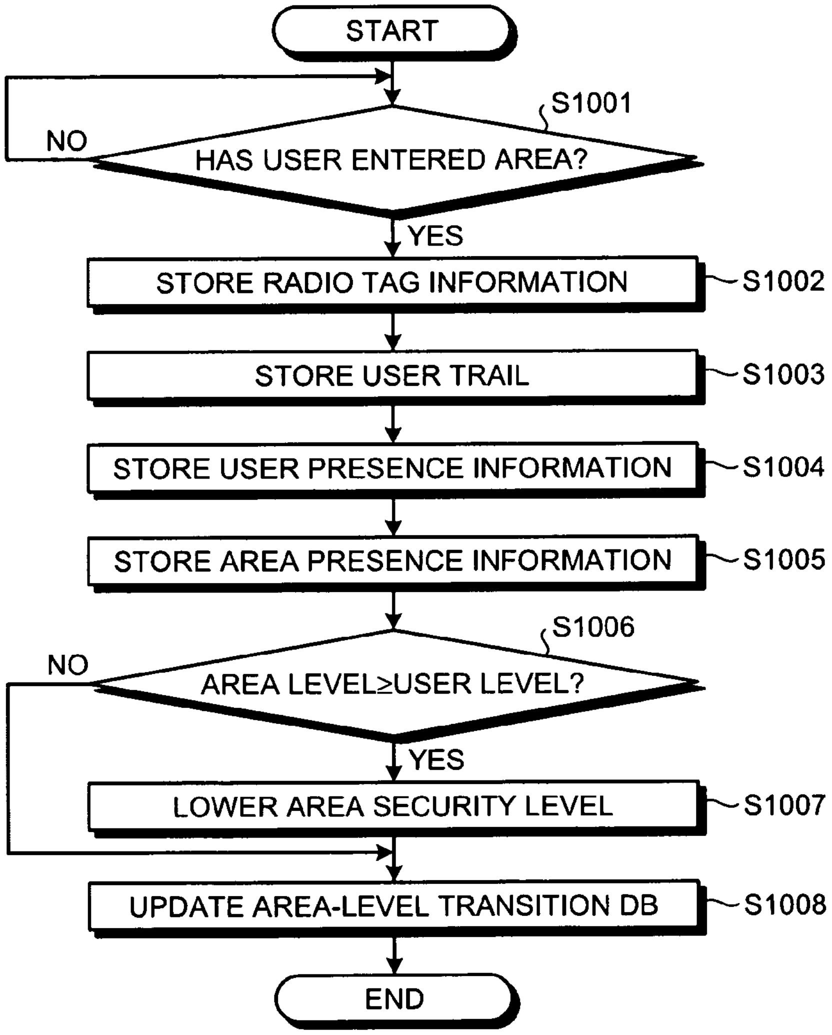
FIG. 9 is a diagram that illustrates an example of information stored in an area-level transition DB.
FIG. 10 is a flowchart that illustrates the flow of a security-level change process performed by the area entry and exit control apparatus according to the first embodiment.

The area-level transition DB 19 stores therein a transition status (change status) of the security level assigned to the area. To take a specific example, as depicted in FIG. 9, the area-level transition DB 19 stores therein "area", "user present", and "area security level" in association with the "time and date" on which the security level is transited. For example, the area-level transition DB 19 stores therein (2007 Apr. 1, area A, Taro Tokkyo (001), security level 1).

The "area" indicates an area whose security level is changed (transited). The "user present" indicates the user present in the area when the security level is changed. The "area security level" indicates the security level after the security level assigned to the area is changed (transited). FIG. 9 is a diagram that illustrates an example of information stored in the area-level transition DB.

The control unit 20 includes an internal memory that stores therein control programs for an operating system (OS), programs that prescribe various procedures, and required data. The control unit 20 includes a radio-tag information processing unit 21, a user-information processing unit 22, a security-level changing unit 23, and an authenticating unit 24 that are the components closely associated with the present invention in particular. The control unit 20 performs various processes by using the above components.

The radio-tag information processing unit 21 acquires the radio tag ID from the radio tag owned by the user. A detailed explanation is given with the above example. The radio-tag information processing unit 21 acquires the radio tag ID (01) from the radio-tag authentication device $R_2$ that has acquired the radio tag ID (01) from the radio tag owned by the user (Taro Tokkyo). The radio-tag information processing unit 21 then stores the radio-tag authentication device $R_2$ that has acquired the radio tag ID and the area B from which the radio tag ID is acquired in the radio tag DB 15 in association with the acquired radio tag ID (01).

The user-information processing unit 22 stores the user presence information, the user trail, and the area presence in accordance with a result of the authentication performed by the biometric authentication device. A detailed explanation is given with the above example. Upon receiving signals indicating that the authentication is allowed (or rejected) by the biometric authentication device $B_1$, the user-information processing unit 22 identifies the user (Taro Tokkyo (001)) corresponding to the radio tag ID (01) acquired by the radio-tag information processing unit 21, the security level stored in the radio tag ID owned by the user, and the expiration date of the radio tag from the user DB 14.

Because the user who owns the radio tag with the acquired radio tag ID (01) has entered the area B from the area A, the user-information processing unit 22 stores "area B" as the area information about the area in which the user is currently present, "security level" stored in the acquired radio tag ID (01), and "continuity" of the authentication in the user presence DB 16 in association with the acquired "radio tag ID=01". Because the security level of the user (Taro Tokkyo) who has entered the area B is "1" and the security level of the area B that the user (Taro Tokkyo) has entered is "2", "no" is stored in the "continuity". Conversely, if the security level of the user who has entered the area is identical to the security level of the area that the user has entered, or if the security level of the area is low, "continuing" is stored in the "continuity".

If the biometric authentication device $B_1$ allows the authentication, it is determined that the user has entered the area B from the area A. Therefore, the user-information processing unit 22 stores "authentication device information=biometric authentication device $B_1$", "area information=area A", and "authentication result=allowed" in the user trail DB 17 in association with the "time and date" on which the signals indicating that the authentication is allowed are received from the biometric authentication device $B_1$. Moreover, the user-information processing unit 22 acquires "presence area information=area B", "continuity=no", "user security level=1", and "area security level=2" from the user presence DB 16 and the user trail DB 17 and then stores them in the area presence DB 18.

The security-level changing unit 23 changes the security level assigned to the area in accordance with the security level of the user currently present in the area. A detailed explanation is given with the above example. The security-level changing unit 23 acquires "user security level 1" and "area security level=2" stored in the area presence DB 18 when the area presence DB 18 is updated. Because the "user security level=1" is lower than the "area security level=2", the security-level changing unit 23 changes the "security level of area B" in which the "user security level=1" is present to "1". The security-level changing unit 23 then stores the changed information in the area-level transition DB 19.

When the user moves between the areas whose security level have been changed by the security-level changing unit 23, the authenticating unit 24 performs a plurality of types of authentication on the user depending on the difference between the security levels of the areas. A detailed explanation is given with the above example. When the user (Taro Tokkyo) moves from the area B whose security level has been changed from "2" to "1" to the area C with the security level "2", the authenticating unit 24 transmits "the authentication notification" to the biometric authentication device $B_3$ so that the gate is unlocked only if both the authentication using the radio tag and the authentication using the biological information are allowed. If the user moves from the area B whose security level has been changed from "2" to "1" to the area A with the security level "1", the authenticating unit 24 notifies the biometric authentication device $B_2$ of the "unlock notification" so that the gate is unlocked if the authentication using the radio tag is allowed.

Process Performed by the Entry and Exit Control Apparatus

Figure 11:
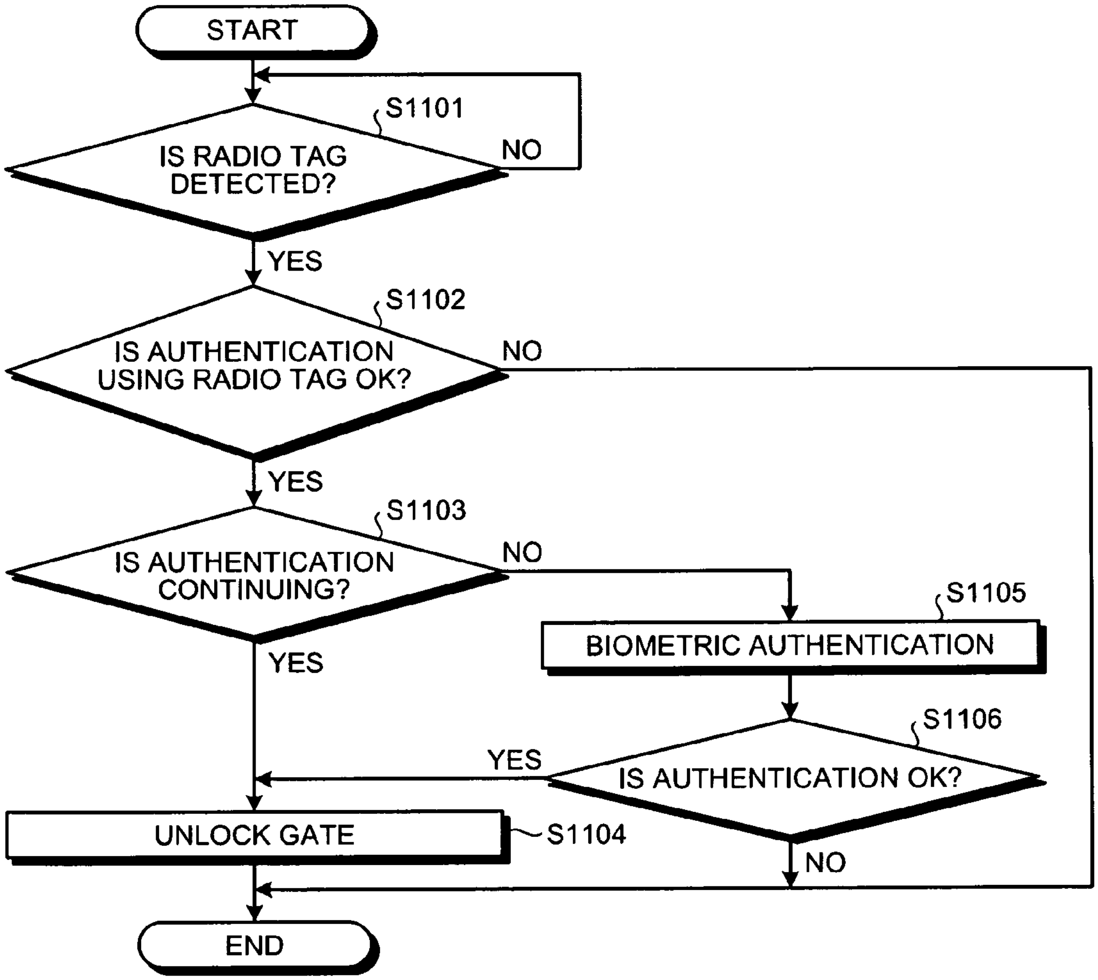
FIG. 11 is a flowchart that illustrates the flow of an authentication process performed by the entry and exit control apparatus according to the first embodiment.

Next, an explanation will be given of the process performed by the entry and exit control apparatus with reference to FIGS. 10 and 11. FIG. 10 is a flowchart that illustrates the flow of the security-level change process performed by the entry and exit control apparatus according to the first embodiment, and FIG. 11 is a flowchart that illustrates the flow of the authentication process performed by the entry and exit control apparatus according to the first embodiment.

Flow of the Security-Level Change Process

As depicted in FIG. 10, when the user enters the area (Yes at Step S1001), the radio-tag information processing unit 21 of the entry and exit control apparatus 10 stores radio tag information about the radio tag owned by the user (Step S1002).

Specifically, if the biometric authentication device $B_1$ allows the authentication whereby the user (Taro Tokkyo) enters the area B from the area A, the radio-tag authentication device $R_2$ acquires the radio tag ID "01" from the radio tag owned by the user and then transmits the acquired radio tag ID "01" to the entry and exit control apparatus 10. The radio-tag information processing unit 21 of the entry and exit control apparatus 10 then stores the radio-tag authentication device that has acquired the radio tag ID and the area information about the area from which the radio tag ID has been acquired in the radio tag DB 15 in association with the radio tag ID "01" received from the radio-tag authentication device $R_2$.

The entry and exit control apparatus 10 then stores the user trail, the user presence information, and the area presence information corresponding to the radio tag ID (01) received from the radio-tag authentication device $R_2$ in the user trail DB 17, the user presence DB 16, and the area presence DB 18, respectively (Steps S1003 to S1005).

Specifically, the user-information processing unit 22 of the entry and exit control apparatus 10 identifies the user (Taro Tokkyo (001)) corresponding to the radio tag ID (01) acquired by the radio-tag information processing unit 21, the security level stored in the radio tag ID owned by the user, the expiration date of the radio tag, and the like, from the user DB 14. The user-information processing unit 22 then stores "area B" that the user has entered, "security level=1" stored in the radio tag ID (01), and "continuity of authentication=no" in the user presence DB 16 in association with the acquired radio tag ID (01). The user-information processing unit 22 then stores "authentication device information=biometric authentication device 1", "area information=area A", and "authentication result=allowed" in the user trail DB 17 in association with "time and date" on which the signals indicating that the authentication is allowed are received from the biometric authentication device $B_1$. The user-information processing unit 22 also acquires "presence area information=area B", "continuity=no", and "user security level=1", and "area security level=2" and stores them in the area presence DB 18.

If the "area security level" is higher than the "user security level" (Yes at Step S1006), the entry and exit control apparatus 10 lowers the area security level (Step S1007) and stores the result in the area-level transition DB 19 (Step S1008).

Specifically, because "area security level=2" of the area B is higher than "user security level=1", the security-level changing unit 23 of the entry and exit control apparatus 10 changes the "security level" of the area from "2" to "1" and stores the result in the area-level transition DB 19.

Flow of the Authentication Process

As depicted in FIG. 11, when the radio tag is detected (Yes at Step S1101), the entry and exit control apparatus 10 receives a notification indicating whether the authentication using the radio tag is allowed from the radio-tag authentication device (Step S1102).

Specifically, when the user enters the area B, the radio-tag authentication device $R_2$ acquires the radio tag ID "01" of the radio tag owned by the user. Because the radio-tag authentication device $R_2$ has stored therein the acquired radio tag ID "01", the radio-tag authentication device $R_2$ transmits a notification that the authentication is allowed to the entry and exit control apparatus 10.

When the authentication is allowed (Yes at Step S1102), the authenticating unit 24 of the entry and exit control apparatus 10 determines whether the "continuity" of the authentication corresponding to the radio tag ID received from the radio-tag authentication device is "continuing" (Step S1103).

Specifically, the authenticating unit 24 determines whether the "continuity" of the authentication corresponding to the radio tag ID "01" received from the radio-tag authentication device $R_2$ is "continuing" by referring to the user presence DB 16 or the area presence DB 18.

If the "continuity" is "continuing" (Yes at Step S1103), the authenticating unit 24 notifies the biometric authentication device of the "unlock notification" to unlock the gate (Step S1104).

If the "continuity" is "no" (No at Step S1103), the authenticating unit 24 transmits the "authentication notification" to the biometric authentication device, and, if the biometric authentication device performs the biometric authentication and allows the authentication, the gate is unlocked (Steps S1105 and S1106).

As described above, according to the first embodiment, the security level assigned to the area B is changed from "2" to "1" in accordance with the security level "1" of the user currently present in the area B, and when the user moves from the area B whose security level has been changed to the area C, the biometric authentication and the radio tag authentication are performed on the user depending on the difference between the security levels of the areas. Thus, convenience and comfort can be improved while high security control can be maintained. Furthermore, it is possible to improve the robustness of the security control.

Moreover, because the user presence and the area presence are stored, it is possible to determine the current status about who is present where not only at a gateway but also in each of the areas. Therefore, it is advantageous to track an unauthorized person who enters or leaves an area or arrange a security guard in an appropriate location in the case of the occurrence of an unexpected problem.

Furthermore, according to the first embodiment, if the user moves from the area B whose security level has been changed to a low security level to the area C with a high security level, the biometric authentication and the radio tag authentication are performed. If the user moves from the area C with a high security level to the area B with a low security level, only the radio tag authentication is performed. Thus, robust security can be implemented while convenience and comfort can be improved.

Moreover, according to the first embodiment, if the security level of the user (Taro Tokkyo) present in the area B to which the security level is assigned is low, the security level "2" assigned to the area B is changed to the low security level "1". Thus, the security level of the area can be changed in accordance with the security level of the user, and as a result, the convenience and the comfort can be further improved.

[b] Second Embodiment

Although the embodiment of the present invention has been described above, the present invention can be embodied in various different configurations other than the embodiment described above. Another embodiment of the present invention will be explained in divided sections as follows: (1) a method of changing the security level; (2) time restriction; (3) control by using a plurality of servers; (4) system configuration, and the like; and (5) programs.

(1) Method of Changing the Security Level

For example, according to the present invention, if the security level of the user currently present in the area is lower than the security level of the area, the security level of the area is lowered, and in addition, the security level of the area can be changed to the original security level when the user leaves the area. Thus, the security level of the area can be dynamically changed in accordance with the security level of the user, and as a result, convenience and comfort can be improved.

A condition for lowering the security level of the area can be, other than the security level of the user as described in the embodiment, a case where an unauthorized radio tag is detected due to impersonation or tailgating, a case where a client or an outsider is detected in an area such as a meeting room or a cafeteria that is commonly used for clients and outsiders, or a case where an unexpected problem occurs so that a door can be opened or closed without authentication due to fire or an earthquake.

Moreover, the security level can be not only lowered but also raised. For example, the security level of an area can be raised if the presence (radio tag) of a client or an outsider is not detected in an area such as a meeting room or a cafeteria that is commonly used for clients and outsiders outside working hours or during holidays, or if a security level of all people present in the area is higher than the security level of the area and the continuity indicates continuing (the continuity is guaranteed).

Furthermore, although it is explained in the embodiment that a plurality of types of authentication (for example, the two types of authentication, i.e., "authentication using a radio tag" and "biometric authentication using biological information") are performed as appropriate authentication depending on the difference between the security levels of the areas, the present invention is not limited to this configuration. For example, three types of authentication that additionally includes "authentication using a password" can be performed. There are no limitations on the types and number of authentication.

(2) Time restriction

Moreover, according to the present invention, if the user moves from an original area to a different area with the same security level and then returns from the different area to the original area, i.e., moves from the area A to the area B and then returns from the area B to the area A before a certain time (for example, 30 minutes) elapses, the user can return to the original area by going through one type of simple authentication. If the certain time has elapsed, a plurality of types of complicated authentication can be performed on the user. Thus, time restrictions can be put on the user who moves between areas with the same security level, and as a result, robust security can be implemented while convenience and comfort can be improved.

For example, although the user can usually move from an original area to a different area with the same security level and then returns from the different area to the original area, i.e., moves from the area A (level 2) to the area B (level 2) and then returns from the area B (level 2) to the area A (level 2) by going through one type of simple authentication, if the user spends too much time moving between the areas, it can be considered as suspicious behavior. Therefore, if the user moves from the original area to the area with the same security level and then returns to the original area before a certain time (for example, 30 minutes) elapses, the user can return to the original area by going through one type of simple authentication. If the certain time has elapsed, a plurality of types of complicated authentication is performed on the user. As a result, more robust security can be implemented.

(3) Control by Using a Plurality of Servers

Furthermore, although it is explained in the first embodiment that the entry and exit control apparatus stores therein and manages various types of information, such as the gate information, the radio tag information, the user information, the user presence information, the user trail, the area presence information, and the area-level transition information, the present invention is not limited to this configuration. The various types of information can be managed by a plurality of servers.

For example, an entry and exit control system can be structured with different control servers, i.e., an entry and exit control server that controls the user information and the gate information, a radio-tag control server that controls the radio tag information, and a presence control server that controls the user presence information, the user trail, the area presence information, and the area-level transition information.

(4) System Configuration, and the Like

Among the processes described in the embodiment, all or some of the processes (for example, the process for detecting the radio tag) that are automatically performed as described above can be performed manually. Furthermore, the procedure, the control procedure, the specific names, and the information (depicted in FIGS. 3 to 9, for example) including various types of data and parameters as described in the specifications and the drawings can be arbitrarily changed except as otherwise noted.

Each of the components of the apparatuses depicted in the drawings is based on a functional concept and does not necessarily need to be physically configured as depicted in the drawings. Specific forms of disintegration and integration of each of the apparatuses and devices are not limited to the one depicted in the drawings. It is possible that all or some of the apparatuses and devices be functionally or physically disintegrated or integrated into any part depending on load or usage (for example, the radio-tag information processing unit and the user-information processing unit can be integrated). All or any of the processing functions performed by each of the apparatuses and devices can be implemented by a CPU and programs analyzed and executed by the CPU or implemented as wired logic hardware.

(5) Programs

Various processes described in the above embodiment can be performed by executing prepared programs using a computer system such as a personal computer or a workstation. An explanation will be given below of, as another embodiment, a computer system that executes a program that has the same functions as those described in the above embodiment.

Figure 12:
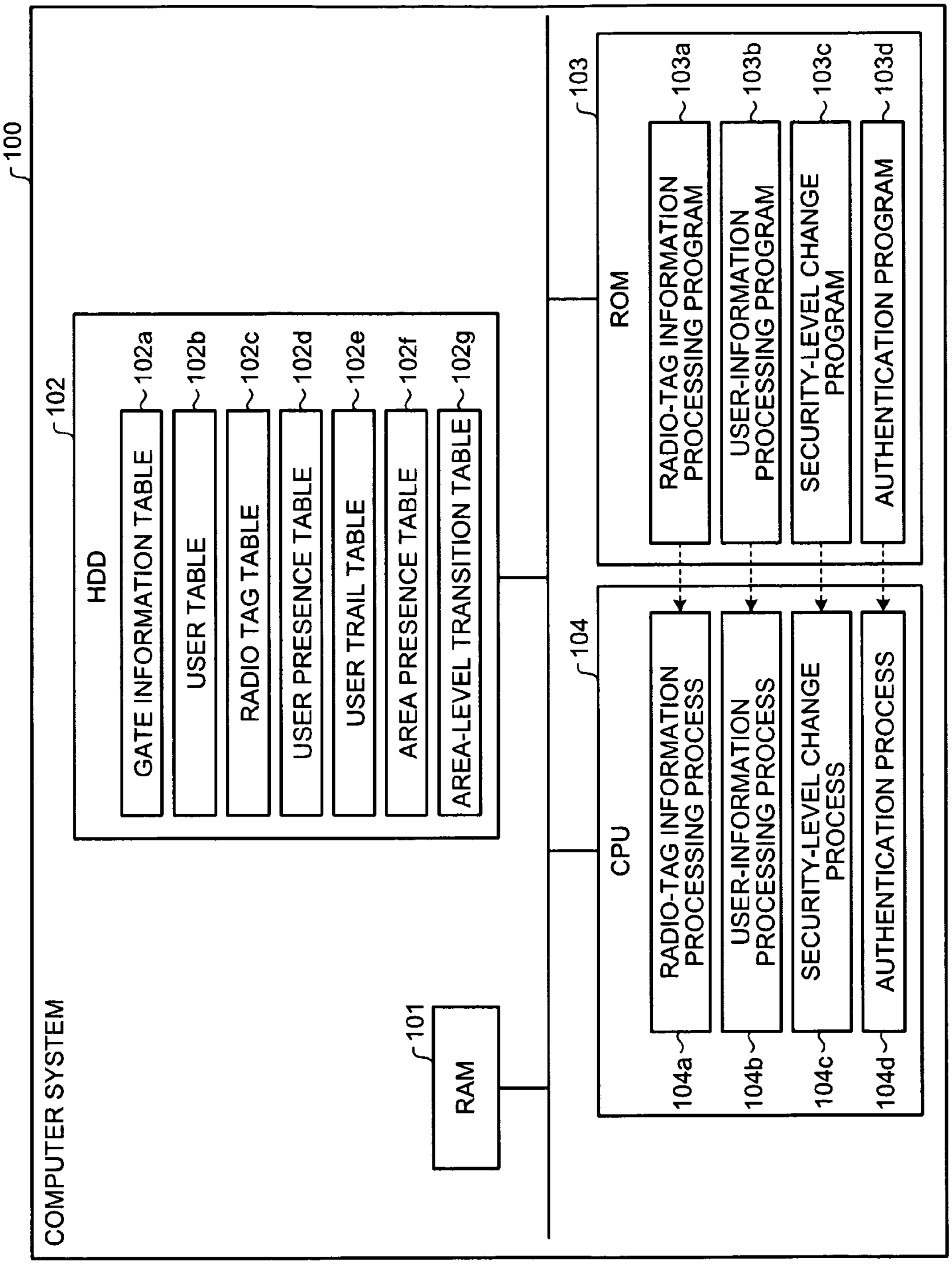
FIG. 12 is a diagram that illustrates an example of a computer system that executes an entry and exit control program.

FIG. 12 is a diagram that illustrates an example of a computer system that executes an entry and exit control program. As depicted in FIG. 12, a computer system 100 includes a RAM 101, an HDD 102, a ROM 103, and a CPU 104. The ROM 103 preliminarily stores therein programs that perform the same functions as those described in the above embodiment, i.e., a radio-tag information processing program 103*a*, a user-information processing program 103*b*, a security-level change program 103*c*, and an authentication program 103*d*, as depicted in FIG. 12.

The CPU 104 reads the programs 103*a* to 103*d* and executes the read programs 103*a* to 103*d*, thereby implementing a radio-tag information processing process 104*a*, a user-information processing process 104*b*, a security-level change process 104*c*, and an authentication process 104*d*, as depicted in FIG. 12. The radio-tag information processing process 104*a* corresponds to the radio-tag information processing unit 21 depicted in FIG. 2, the user-information processing process 104*b* corresponds to the user-information processing unit 22, the security-level change process 104*c* corresponds to the security-level changing unit 23, and the authentication process 104*d* corresponds to the authenticating unit 24.

The HDD 102 stores therein a gate information table 102*a* that stores therein information about the gates located between the areas, a user table 102*b* that stores therein information about the user who owns the radio tag, a radio tag table 102*c* that stores therein information about the radio tag owned by the user and detected by the radio-tag authentication device, a user presence table 102*d* that stores therein the area where the user is present, a user trail table 102*e* that stores therein the trails of the user who enters and leaves the areas, an area presence table 102*f* that stores therein a presence status of the user in the area, and an area-level transition table 102*g* that stores therein a transition status (change status) of the security level assigned to the area.

The gate information table 102*a* corresponds to the gate information DB 13 depicted in FIG. 2, the user table 102*b* corresponds to the user DB 14, the radio tag table 102*c* corresponds to the radio tag DB 15, the user presence table 102*d* corresponds to the user presence DB 16, the user trail table 102*e* corresponds to the user trail DB 17, the area presence table 102*f* corresponds to the area presence DB 18, and the area-level transition table 102*g* corresponds to the area-level transition DB 19.

The above programs 103*a* to 103*d* do not necessarily need to be stored in the ROM 103. For example, it is possible that the programs 103*a* to 103*d* be stored in a "portable physical medium", such as a flexible disk (FD), a CD-ROM, a magnetooptical (MO) disk, a DVD, or an IC card, to be inserted into the computer system 100, a "fixed physical medium", such as a hard disk drive (HDD), arranged inside or outside of the computer system 100, or a "different computer system" connected to the computer system 100 via a public line, the Internet, a LAN, a WAN, or the like. The computer system 100 can read the programs 103*a* to 103*d* from the portable physical medium, the fixed physical medium, or the different computer system and execute the read programs 103*a* to 103*d*.

According to an embodiment of the present invention, convenience and comfort can be improved while high security control can be maintained.

Furthermore, because it is possible to determine the current status about who is present where not only at a gateway but also in each of the areas, it is advantageous to track an unauthorized person who enters or leaves an area or arrange a security guard in an appropriate location in the case of the occurrence of an unexpected problem.

Moreover, according to an embodiment of the present invention, more robust security can be implemented and convenience and comfort can be improved.

Furthermore, according to an embodiment of the present invention, the security level of an area can be changed in accordance with the security level of the user, and as a result, convenience and comfort can be improved.

Moreover, according to an embodiment of the present invention, time restrictions can be put on the user who moves between the areas with the same security level, and as a result, convenience and comfort can be improved while more robust security can be implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable non-transitory storage medium having stored therein an entry and exit control program for determining, when a single user enters or leaves an area to which a security level is assigned, whether the user is allowed to enter or leave the area by performing authentication, the entry and exit control program causing a computer to execute a process comprising:

first performing, when the user associated with a security level moves from a first to which a first security level is assigned to a second area to which a second security level is assigned, an advanced authentication of identification information of the user, the second security level being higher than the first security level;

changing, when the user is present in the second area and the second security level is higher than the security level of the user, a security level of the second area to the security level of the user; and second performing including performing the advanced authentication when the user moves from the second area to an area to which a security level higher than the changed security level of the second area is assigned, and performing a simplified authentication when the user moves from the second area to an area to which a security level identical to or lower than the changed security level of the second area is assigned.

2. The computer-readable non-transitory storage medium according to claim 1, wherein the advanced authentication includes a plurality of types of authentication of the identification information of the user.

3. The computer-readable non-transitory storage medium according to claim 2, wherein the simplified authentication includes one of the plurality of types of the authentication.

4. The computer-readable non-transitory storage medium according to claim 1, the process further comprising changing the changed security level of the second area to the second security level when the user leaves the second area.

5. The computer-readable non-transitory storage medium according to claim 1, wherein the second performing includes performing the advanced authentication when the user moves from the second area to an area to which a security level identical to the changed security level of the second area is assigned and a predetermined time has elapsed after the user left the area.

6. An entry and exit control method for determining, when a single user enters or leaves an area to which a security level is assigned, whether the user is allowed to enter or leave the area by performing authentication, the method comprising:

first performing, when the user associated with a security level moves from a first area to which a first security level is assigned to a second area to which a second security level is assigned, an advanced authentication of identification information of the user, the second security level being higher than the first security level;

changing, when the user is present in the second area and the second security level is higher than the security level of the user, a security level of the second area to the security level of the user; and second performing including performing the advanced authentication when the user moves from the second area to an area to which a security level higher than the changed security level of the second area is assigned, and performing a simplified authentication when the user moves from the second area to an area to which a security level identical to or lower than the changed security level of the second area is assigned.

7. The entry and exit control method according to claim 6, wherein the advanced authentication includes a plurality of types of authentication of the identification information of the user.

8. The entry and exit control method according to claim 7, wherein the simplified authentication includes one of the plurality of types of the authentication.

9. The entry and exit control method according to claim 6, the process further comprising changing the changed security level of the second area to the second security level when the user leaves the second area.

10. The entry and exit control method according to claim 6, wherein the second performing includes performing the advanced authentication when the user moves from the second area to an area to which a security level identical to the changed security level of the second area is assigned and a predetermined time has elapsed after the user left the area.

11. An entry and exit control apparatus for determining, when a single user enters or leaves an area to which a security level is assigned, whether the user is allowed to enter or leave the area by performing authentication, the apparatus comprising:

an authentication unit that performs, when the user associated with a security level moves from a first area to which a first security level is assigned to a second area to which a second security level is assigned, an advanced authentication of identification information of the user, the second security level being higher than the first security level; and a security level changing unit that changes, when the user is present in the second area and the second security level is higher than the security level of the user, a security level of the second area to the security level of the user, wherein the authentication unit further performs the advanced authentication when the user moves from the second area to an area to which a security level higher than the changed security level of the second area is assigned, or further performs a simplified authentication when the user moves from the second area to an area to which a security level identical to or lower than the changed security level of the second area is assigned.

* * * * *